INVENTOR
JOHN T. CHAMBERS
BY
ATTORNEYS

United States Patent Office 3,267,733
Patented August 23, 1966

3,267,733
THERMOMETER
John T. Chambers, Sunnyvale, Calif., assignor to American Radiator & Standard Sanitary Corporation, New York, N.Y., a corporation of Delaware
Filed June 19, 1963, Ser. No. 289,082
5 Claims. (Cl. 73—362)

This invention relates generally to a thermometer and more particularly to a resistance thermometer capable of measuring high temperatures, for example, temperatures of 1500° C. or more.

Temperature can be determined by measuring the resistance of an elongated element. However, when a wide range of temperature is measured, the temperature coefficient of resistance of the element may be different at different temperatures in the range. This results in a non-linear relationship between resistance and temperature. In some applications, calibration curves have been provided to give the correct temperature from a resistance reading. In others, the electrical circuits employed to measure the resistance are designed to compensate for the change in temperature coefficient of resistance with temperature.

It is a general object of the present invention to provide a resistance thermometer whose resistance changes linearly with temperature over a wide range of temperatures.

It is another object of the present invention to provide a resistance thermometer in which the elongated resistive element is supported in a ceramic mounting having a temperature coefficient of resistance such that it cooperates with the resistive element to provide a shunt resistance path whereby to give a temperature coefficient of resistance for the combination which is constant with temperature.

It is another object of the present invention to provide a thermometer which will permit measurement of high temperatures in the range of 1500° C. or more.

It is a further object of the present invention to provide a resistance thermometer which is relatively simple in construction, inexpensive to manufacture, and which provides relatively constant temperature of coefficient of resistance over a wide range of temperatures.

These and other objects of the invention will become more clearly apparent from the following description taken in conjunction with the accompanying drawing.

Referring to the drawing.

Figure 1:
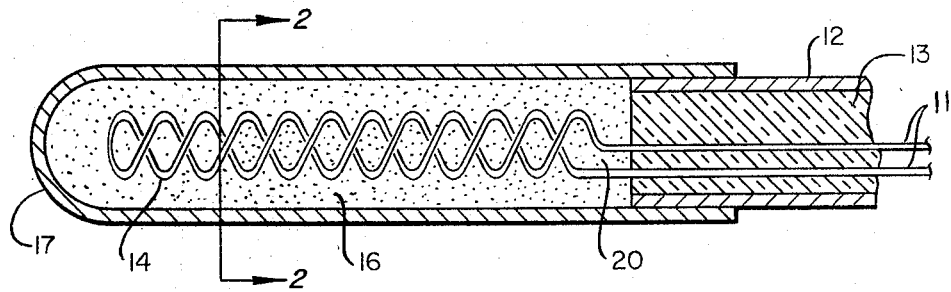
FIGURE 1 shows a cross-sectional view of a resistance thermometer in accordance with the present invention.
Figure 2:
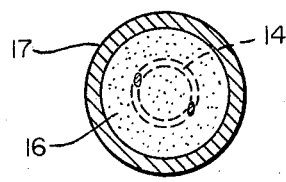
FIGURE 2 shows a sectional view taken generally along the line 2—2 of FIGURE 1.

The thermometer, FIGURE 1, includes lead wires 11 supported in a refractory metal or ceramic sleeve 12 by suitable insulating material 13, for example, an oxide of magnesium, yttrium, beryllium or the like.

The elongated resistive element 14 is in the form of an interwound spiral. It comprises material having a high temperature coefficient of resistance for good sensitivity and capable of withstanding relatively high temperatures for measurement of high temperatures. Encapsulating and supporting the elongated resistive element 14 is an oxide encapsulation 16. As will be presently described, the oxide encapsulation is selected to have a temperature coefficient of resistance which changes with temperature in such a manner to compensate for changes in the temperature coefficient of resistance of the elongated resistive element 14. The oxide encapsulation 16 is supported within a refractory metal or ceramic tube 17 suitably secured to the sleeve 12.

As is known, resistive elements have a temperature coefficient of resistance which may be different at different temperatures, that is, which changes with temperature. Where a relatively narrow range of temperature is to be measured by the resistive element, the effect of changes in the temperature coefficient of resistance with temperature may be neglected. However, when relatively broad ranges of temperatures are to be measured, the change of temperature coefficient of resistance with temperature cannot be neglected. In the prior art, compensating circuits or calibration charts were required.

In accordance with the present invention, the resistive element is encapsulated or embedded in a material having a temperature coefficient of resistance which changes opposite to that of the elongated resistance element. This material provides a shunt resistance path along the length of the element and between the closely adjacent portions 20 of the element. The effect of the change in resistance of the shunt path with temperature is to compensate for the non-linearity of the change of resistance of the resistance element whereby the combined resistance changes linearly with temperature. (The combined temperature coefficient of resistance is substantially constant.)

In one specific example, the iridium wires 11 were supported within a sleeve 12 by a pure beryllium oxide insulation 13. The encapsulating material 16 was a compound of yttrium oxide ($Y_2O_3$), zirconium oxide ($ZrO_2$) and calcium oxide (CaO) in the proportion 65.4% by weight of yttrium oxide to 33.8% by weight of zirconium oxide and 0.8% by weight of calcium oxide.

Figure 3:
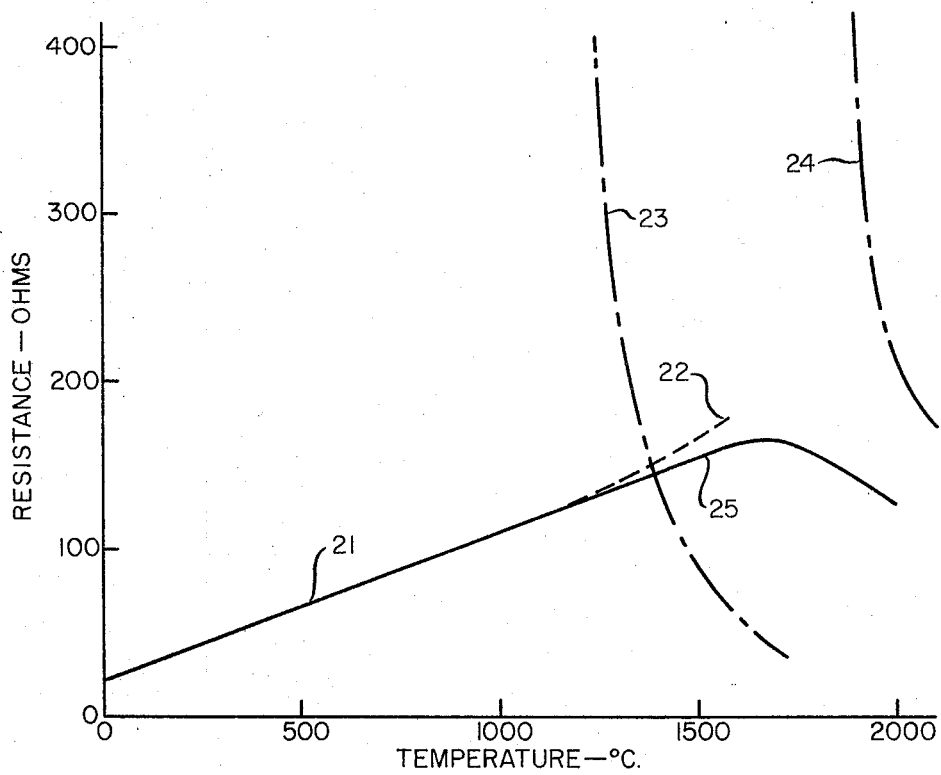
FIGURE 3 shows a curve of resistance as a function of temperature for a thermometer constructed in accordance with the present invention.

At the lower temperatures, the temperature coefficient of resistance of the iridium wire is relatively constant with changes in temperature as indicated by the portion 21 of the curve shown in FIGURE 3. However, at temperatures of 1000° C. and above, the temperature coefficient of resistance of the iridium wire increases with temperature and provides a resistance curve of the type shown by the dotted line 22, FIGURE 3. In order to measure relatively high temperature without the use of calibration charts or compensating networks, it is desirable to obtain a relatively linear coefficient of temperature. The resistance of zirconium oxide stabilized with calcium oxide is almost infinite up to a temperature of 1300° C. and then decreases rapidly with temperature as shown by the curve 23, FIGURE 3. The resistance of yttrium oxide is also infinite decreasing at above 1900° C. as shown by the curve 24, FIGURE 3. By embedding the iridium wire 14 in the ceramic compound described above, the change in resistance with temperature because of the shunt resistance of the encapsulation was as indicated by the solid curve 25. In summary then, the ceramic compound shunts the elongated resistive element in such a manner as to provide an opposite temperature coefficient of resistance which, combined with the temperature coefficient of resistance of the iridium wire, gives a linear relationship of resistance as a function of temperature.

The curve shown was for a length L of element 14 equal to 37 inches; separation S of the wire at 20 of $9/17$ of an inch; and wire diameter .002 inch (of cross-sectional area A equal to $3.14 \times 10^{-6}$ square inches) to provide a ratio $AS/L = 1.59 \times 10^{-8}$ square inches. Maintenance of the foregoing ratio results in a linear temperature coefficient of resistance when employing the particular compounds set forth. It is apparent that for other types of ceramic encapsulation, other types of wire can be selected so that the combination gives a constant temperature coefficient of resistance over a wide range of temperatures.

I claim:
1. A temperature responsive device comprising an elongated resistive element having a first temperature coefficient of resistivity which changes in one direction with increasing temperature, encapsulating means serving to encapsulate and support said elongated resistive element, said encapsulation serving additionally to provide a shunt resistance path, said encapsulating means having a preselected temperature coefficient of resistivity which changes in an opposite direction with increasing temperature in such a way as to compensate for said change of said first temperature coefficient of resistivity to maintain the temperature coefficient of resistivity of the combination substantially constant over a predetermined range of temperature.

2. A temperature responsive device comprising an elongated resistive element having a first temperature coefficient of resistivity which increases with increasing temperature, encapsulating means serving to encapsulate and support said elongated resistive element and provide a shunt resistance path, said encapsulating means having a preselected temperature coefficient of resistivity which decreases with increasing temperature in such a way as to compensate for said change of said first temperature coefficient of resistivity to maintain the temperature coefficient of resistivity of the combination substantially constant over a predetermined range of temperature.

3. A temperature responsive device comprising an elongated resistive element having a temperature coefficient of resistivity which is relatively constant over a predetermined first range of temperature and which increases with temperature over a second range of temperature extending above said first range of temperature, means for encapsulating said resistive element and providing a shunt resistance path, said encapsulating means having a resistance which is substantially higher than the resistance of said elongated resistance element over said first range of temperature whereby it has a negligible effect on its resistance and having a finite resistance with a preselected temperature coefficient which decreases with increasing temperature over said second range in such a way as to compensate for said change of said first temperature coefficient of resistivity to provide in combination with said resistive element a temperature coefficient of resistance which is substantially constant over said second range of temperature whereby the resistance of the combination varies linearly over said range of temperature.

4. A temperature responsive device comprising an elongated iridium resistive element having a first temperature coefficient of resistivity characteristic over a predetermined temperature range, a compound of yttrium oxide, zirconium oxide and calcium oxide having a second temperature coefficient of resistivity characteristic over such range, encapsulating said elongated iridium element and cooperating therewith to provide a shunt path for said iridium resistive element in said predetermined temperature range, the relative percentages of yttrium oxide, zirconium oxide, and calcium oxide being preselected to compensate for said first temperature characteristic to provide in combination a temperature coefficient of resistance which is substantially constant over said predetermined range of temperature.

5. A temperature responsive device comprising an elongated iridium resistive element, means for encapsulating said elongated iridium element and cooperating therewith to provide in combination a temperature coefficient of resistance which is substantially constant over a predetermined range of temperature, said encapsulating means comprising a compound including by weight percentage yttrium oxide in the range of 60–70 percent, zirconium oxide in the range of 30–40 percent, and calcium oxide in the range of .5–2 percent.

References Cited by the Examiner

UNITED STATES PATENTS

| 822,338 | 6/1906 | Bennett | 73—362 X |
|---|---|---|---|
| 2,768,266 | 10/1956 | Marsden | 340—228 |
| 3,052,124 | 9/1962 | Averitt | 73—362 |
| 3,132,320 | 5/1964 | Gee et al. | 338—28 |

FOREIGN PATENTS 514,212   11/1939   Great Britain.

OTHER REFERENCES

Publication: "Ceramic Fabrication Process," April 1959, pages 151 and 152. Article is entitled "Zirconia."

LOUIS R. PRINCE, *Primary Examiner.*

D. M. YASICH, *Assistant Examiner.*